United States Patent

[11] 3,529,514

[72] Inventors: Millard G. Mayo
Wethersfield, Connecticut;
Raymond N. Quenneville, Suffield,
Connecticut
[21] Appl. No. 810,271
[22] Filed March 25, 1969
[45] Patented Sept. 22, 1970
[73] Assignee United Aircraft Corporation
East Hartford, Connecticut
a corporation of Delaware

[54] REDUNDANT SERVOMECHANISM WITH BYPASS PROVISIONS
7 Claims, 2 Drawing Figs.

[52] U.S. Cl. .................................................. 91/411,
60/97
[51] Int. Cl. .................................................. F15b 11/06
[50] Field of Search .......................................... 91/411,
411A, 412, 413, 414(Cursory); 60/974, 97P

[56] References Cited
UNITED STATES PATENTS
2,597,419  5/1952  Westbury et al. ............... 91/414X
2,826,896  3/1958  Glaze et al. ..................... 91/411(A)UX FOREIGN PATENTS
670,352  4/1952  Great Britain ................. 91/412

Primary Examiner—Edgar W. Geoghegan
Attorney—Edmund C. Meisinger

ABSTRACT: A distributor valve is disclosed wherein hydraulic fluid is distributed to a blade angle change actuator in two separate and hydraulically isolated systems for VTOL aircraft propeller applications. The distributor valve consists of two separate spools which meter the hydraulic fluid supplied by the separate pumping systems. Motion of the spools forward of a null position meters hydraulic fluid to the high pitch side of the dual actuator pistons causing blade motion to high pitch. Conversely, motion of the valves aft of the null position moves the blades toward low pitch. A constant blade angle is maintained when the valve is positioned near the null position. The dual valve spools are mounted on a rod and are spring preloaded in position. During normal operation, the two valve spools and rod move as a single unit. Should one valve seize, the spring override permits the remaining valve to function normally. In addition, the supply of actuator fluid in the inoperative system is drained off by uncovering a bypass in the inoperative spool valve.

Patented Sept. 22, 1970
3,529,514
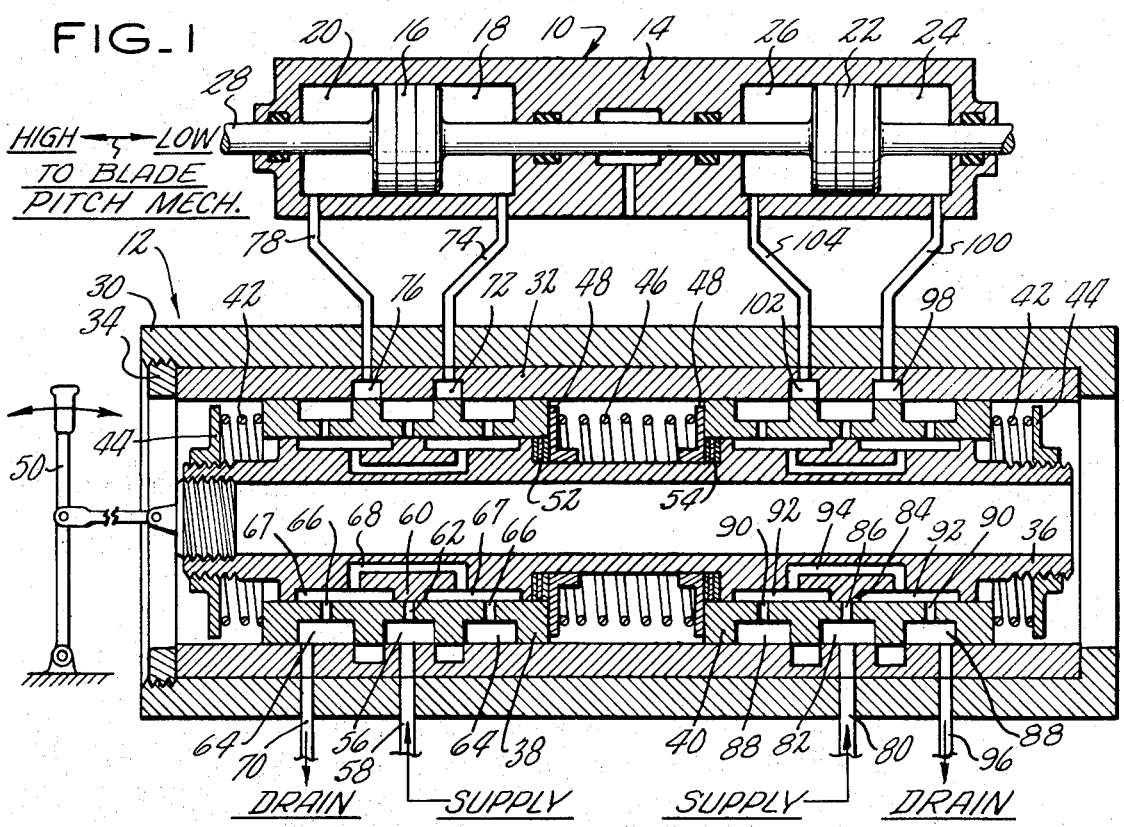
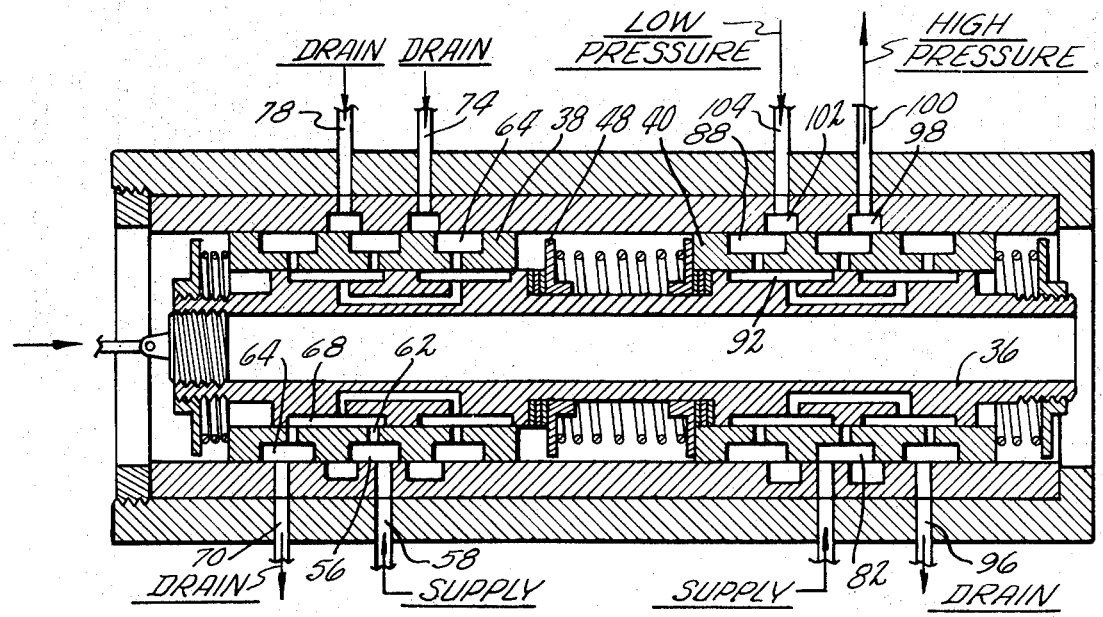
INVENTORS
MILLARD G. MAYO
RAYMOND N. QUENNEVILLE
BY Edmund C. Musinger
ATTORNEY

[3,529,514]

REDUNDANT SERVOMECHANISM WITH BYPASS PROVISIONS

BACKGROUND OF THE INVENTION

This invention relates to valves and more specifically to redundant distributor valves for hydraulic flight control mechanisms.

Servo-valves have long been used in a wide variety of flight control systems to regulate hydraulic actuators for various applications. For example, aircraft propeller pitch control is commonly regulated by positioning a servo-cylinder geared to the propeller distributor valve. The principle of redundant hydraulic systems wherein parallel systems drive a blade angle change mechanism has been increasingly employed to improve the reliability of such systems. The desire to achieve fail-safe control systems to prevent a failure of a hydraulic servo caused by sticking or damage to the servo-valve has long been a primary consideration. Numerous approaches have been taken in solving the fail-safe control system problems. It has been proposed to provide a servo-control valve having an override feature. However in these systems it is often found that there is no delicate control of the metering surfaces after the seizure of the servo-valve has occurred. Redundant systems have been devised. In these designs, it is often difficult to detect a malfunction and switch automatically from one system to the other system without loss of aircraft control. In some systems the pilot is required to shut off the hydraulic supply pressure to the servo in order to reverse the flow to the actuating pistons when a servo-valve sticks in the open position. Mere duplication of systems does not prevent or guard against the catastrophic results which may arise from the seizure of one of the servo-valves.

SUMMARY OF THE INVENTION

It is an object of this invention to provide an improved servo-valve with bypass features.

Another object of the invention is the hydraulic isolation of two servomechanisms to maintain system redundancy necessary for maximum reliability of the system.

Another object of the invention is the provision of a redundant distributor valve system wherein seizure of one servo-valve does not prevent the system from operating, and the inoperative servo-valve is automatically vented to prevent the trapped hydraulic fluid in the malfunctioning fluid from building up back pressure to resist operation of the operative valve.

In accordance with the invention, separate spool valves which meter hydraulic fluid supplied by separate pumping systems are mounted on a rod and are spring preloaded in position. Motion of the rod and spool valves forward of the null position meter hydraulic fluid through the valve housing to the high pitch side of power pistons in a hydraulic actuator. Motion of the valves aft of the null position meters hydraulic fluid to the low pitch side of the actuator pistons. Blade angle is maintained constant when the valves are positioned in the null position. Should one valve seize, the springs positioning the valves permit the remaining valve to function normally. Means responsive to decreased pressure may be provided to indicate when a particular spool valve becomes inoperative.

Other objects and advantages of the present invention will become more apparent from the following detailed description of a preferred embodiment thereof and from the accompanying drawings.

DESCRIPTION OF THE DRAWINGS

FIG. 1 is a schematic view showing the preferred embodiment of the invention interconnected with a hydraulic actuator having dual power pistons.

FIG. 2 is a schematic view of the distributor valves showing the first spool valve seized in the decreasing pitch position and the second spool valve metering to increase pitch.

DESCRIPTION OF THE PREFERRED EMBODIMENT

Referring to FIG. 1, a redundant hydraulic servomechanism for directing hydraulic fluid to a power actuator is shown having a hydraulic power actuator indicated generally as 10 and a dual distributor valve indicated generally as 12. The hydraulic actuator 10 has a housing 14 and a first power piston 16 and a high pitch pressure chamber 18 and a low pitch pressure chamber 20. A second power piston 22 is interconnected to the first power piston 16 and has its respective high pitch pressure chamber 24 and low pitch pressure chamber 26. Both power pistons operate in phase and cooperate in sharing the load transmitted through shaft 28 to a blade pitch change mechanism (not shown).

The control valve 12 includes a housing 30 and a closely fitting sleeve 32 disposed within an opening in the housing. The sleeve is centered and held in place with respect to the housing by means of a threaded collar 34. Within the sleeve is a translatable rod 36 having closely fitted distributor valve spools 38 and 40 disposed on the rod for metering hydraulic fluid to the power pistons. End springs 42 engage spring retainers 44 located at the ends of the rod 36 and cooperate with the spring guides 48 and the central spring 46 to locate the first spool 38 and the second spool 40 on the translatable rod 36. It is apparent that the springs and retainers are so dimensioned and so located that normally the spools 38 and 40 translate simultaneously with the rod 36. An aircraft power lever 50 is shown as being connected to the rod 36 for providing a manual actuating force to translate the rod forward to the high pitch or aft to the low pitch position. While manual means are shown as providing the direct force input to the translatable rod 36, it is evident that a servomechanism may be interposed between the power lever and the control rod. The spool valves are shimmed to the same hydraulic center to insure equal sharing of the pitch change load between the two hydraulic power pistons. Shims 52 and 54 are located behind central spring retainers 48 to align spool valves 38 and 40 with the ports in sleeve 32. The tension of the springs is intended to fix the spools relative to the central rod 36. If one of the spools should seize with respect to the sleeve 32, further translation of the rod and the unseized spool may continue to distribute fluid by overcoming the spring forces associated with the seized spool.

Hydraulic fluid is supplied to the circumferential groove 56 in the first spool 38 through passageway 58. Land 60 is provided on the rod 36 to prevent hydraulic fluid from draining from the circumferential groove through ports 62. Drain grooves 64 are provided in the spool 38 and are interconnected through ports 66, grooves 67 and passageways 68 in the central rod 36. Thus, fluid in the drain passageways is collected and drained through passageway 70. Groove 72 in the sleeve 32 is connected through passageway 74 to the high pitch chamber 18 of the first power piston. Groove 76 is connected through passageway 78 to the low pitch chamber 20 of the first power piston. As shown, the hydraulic supply fluid is locked in chamber 56 and is prevented from supplying pressure to either side of the power piston. Both sides of the power piston contain hydraulic fluid under pressure which is locked in the chambers of the first power piston thereby locking the blade pitch change mechanism.

The second spool 40 has a supply passageway 80 leading to a circumferential groove 82 in the second spool. Land 84 on the rod 36 prevents fluid from draining from the groove 82 through ports 86. Additional circumferential drain grooves 88 in the spool 40 are interconnected through ports 90, grooves 92 and passageways 94 in the central rod 36. Thus, any hydraulic fluid collecting in the interconnected drain system is allowed to drain through passageway 96. Groove 98 is connected to the high pitch pressure chamber 24 of the second power piston through passageway 100, and groove 102 is connected to the low pitch pressure chamber 26 of the second power piston through passageway 104. The alignment of grooves and passageways shown in FIG. 1 is such that hydraulic fluid is not supplied or drained from the pressure chambers 24 and 26.

As previously stated, the redundant spool valves are shown in the null position. Metering of hydraulic fluid occurs due to the orientation of the spools relative to the sleeve. Experience has shown that seizure of the spool valves is due to foreign material wedging between a metering land and a port thereby positioning a spool valve partially open. Seizure in the null position is an extremely remote possibility. However, if one valve should stick in the null position, hydraulic lock associated with the seized spool is prevented by providing negative lap on the metering lands of the spool and by the normal valve clearance between the spool and the sleeve. This combination of tolerances permits fluid to flow past the lands at a reduced rate until the pressure chambers of the power piston are empty.

As the power lever 50 moves forward, the rod and spool assembly moves to the right opening the grooves 72 and 98 to the supply grooves 56 and 82 respectively. Supply fluid is directed to the high pitch chambers 18 and 24 of the power pistons. At the same time, the circumferential grooves 76 and 102 open to the drain grooves 64 and 88 to allow hydraulic fluid to drain from the low pitch chambers 20 and 26 of the power pistons. Thus, motion of the valve spools forward of the null position meters hydraulic fluid to the high pitch side and drains fluid from the low pitch side of the dual power pistons causing blade motion to high pitch. In similar fashion, as the power lever is translated aft of the null position, the circumferential grooves 56 and 82 open to supply fluid to circumferential grooves 76 and 102 thereby supplying fluid to the low pitch chambers 20 and 26 of the power pistons. Simultaneously, the circumferential grooves 72 and 98 are vented to the drain grooves 64 and 88 to allow hydraulic fluid to drain from the high pitch chambers 18 and 24 of the power pistons. Thus, motion of the valves aft of the null position moves the blade pitch change mechanism toward low pitch.

FIG. 2 illustrates the position of the spools when the first spool valve has seized in the decreasing pitch position and the second spool valve is metering to increase pitch. Spool 38 has seized in the aft position which is left of null. The rod 36 has translated forward carrying the second spool 40 and the spring forces on opposite ends of spool 40 retain it in its normal position relative to the rod 36. Spool 38 separates from the spring retainer due to the seizure of the spool by the outer sleeve. Hydraulic pressure does not build up in the first power piston chambers since fluid from chambers 18 and 20 is allowed to drain through passageways 74 and 78 into the drain groove 64 and the supply groove 56 which has been opened to the drain system through ports 62. At the same time, the supply pressure provided through passageway 58 is also vented through the ports 62 into the drain system. Although spool 38 has seized and fluid drains from the chambers of the first power piston, the second power piston continues to meter fluid to the high pitch chamber 24 of the second power piston. The supply fluid is directed through groove 82 into groove 98 and thereafter through passageway 100 to the chamber 24. Simultaneously, fluid from chamber 26 drains into groove 102 and out through the drain grooves 88 through the interconnecting passageway 92 to the drain passageway 96. It is apparent that hydraulic fluid in the seized spool system is bypassed and vented, and the control valve that has not seized continues to function in accordance with the power lever demands as supplied by the pilot. The bypass arrangement operates automatically to vent the system associated with the malfunctioning spool valve while the remaining spool valve continues to function normally to supply the blade pitches desired.

Both power pistons are sized and designed to accept the full load variation which will be experienced during normal operation. Consequently, the full range of blade pitches can be selected by a single power piston as would be required if a single spool valve seizes. A signal device may be provided to indicate when a particular spool valve has seized. Accordingly, the pilot will be aware of any malfunction and shut off the supply pressure to the inoperative system. This provision merely informs the pilot of a malfunction and the operative spool valve continues to supply pressure upon demand.

Broadly, the invention concerns a fail-safe redundant system intended for use as an inline arrangement wherein dual spools are disposed on a central translatable rod. However, it is apparent that the assembly may be separated to provide a side-by-side distributor valve arrangement as long as the bypass provisions are provided. The inline arrangement has many useful applications, as for example, in the head of a propeller where the elongated low profile design is more practical. If a single valve seizes, complete operation continues; consequently, this scheme is a truly redundant arrangement. Since there are two independent spool valves continually monitoring operation, there are obviously separate systems, each of which can provide full and smooth control regardless of the seizure of one valve. There is full metering with the unseized valve after the seized valve becomes inoperative.

While a particular bypass arrangement is shown and described and the invention has been described with respect to the preferred embodiment, it should be understood by those skilled in the art that various changes and omissions in the form and detail may be made therein without departing from the spirit and the scope of this invention.

We claim:

1. A redundant hydraulic servomechanism for directing hydraulic fluid to separate power actuators having multiple distributor valves with bypass provisions wherein each distributor valve comprises:

a housing having a closely fitting sleeve disposed therein;

a translatable valve rod disposed within the housing;

a hydraulic fluid control spool on the rod and spring means for positioning the spool on the rod so that the spool normally translates simultaneously with the rod;

a first and a second fluid passageway connected to the housing for supply and drain respectively of hydraulic fluid controlled by the sleeve cooperating with the spool;

a third and a fourth passageway connecting the hydraulic fluid controlled by the spool in the housing to the chambers of a power actuator;

means for translating the valve rod whereby the flow of fluid to and from the power actuator is controlled normally by the spool cooperating with the sleeve; and bypass means whereby seizure of the spool by the sleeve uncovers the bypass means to drain the hydraulic fluid in the inoperative distributor valve system.

2. A redundant servomechanism as in claim 1 wherein two spool valves are disposed on a single translatable rod in a common housing and aligned with ports in the sleeves to provide equal sharing of the load.

3. A redundant servomechanism as in claim 1 wherein the bypass means allows hydraulic fluid to drain from the inoperative system through the central portion of the translatable rod.

4. A redundant hydraulic servomechanism comprising:

a hydraulic power actuator having a first and a second power piston mounted therein;

a valve housing having a first and a second closely fitting sleeve and a translatable rod disposed within the sleeves;

spring means axially positioning a first spool and a second spool on the rod whereby the first and second spools normally translate simultaneously with the rod and translation of the rod and the remaining spool is permitted upon seizure of either spool;

first and second fluid passageways connected to the housing for supply and drain respectively of fluid controlled by the first spool cooperating with the first sleeve;

third and fourth fluid passageways connected to the housing for directing hydraulic fluid controlled by the first spool and first sleeve to the chambers of the first power piston;

fifth and sixth fluid passageways connected to the housing for the supply and drain, respectively, of fluid controlled by the second spool cooperating with the second sleeve;

seventh and eighth fluid passageways connected to the housing for directing hydraulic fluid controlled by the second spool and second sleeve to the chambers of the second power piston;

means for translating the rod whereby the flow of fluid to the first power piston is controlled normally by the simultaneous movement of the first spool with the rod through selective control of flow from the first and second passageways to the third and fourth passageways and whereby the flow of fluid to the second power piston is controlled normally by the simultaneous movement of the second spool with the rod through selective control of flow from the fifth and sixth passageways to the seventh and eighth passageways; and a first bypass means and a second bypass means whereby seizure of either spool uncovers the bypass means to drain hydraulic fluid in the inoperative system.

5. A hydraulic servomechanism as in claim 4, wherein the spring means positioning the first and second spools comprises springs disposed at the distal ends of the spools and a spring interposed between the spools.

6. A hydraulic servomechanism as in claim 5 wherein the means for translating the rod is responsive to a manual input.

7. A hydraulic servomechanism as in claim 4, wherein the closely fitting sleeves comprise a single cylindrical unit.